(12) United States Patent
Moreno et al.

(10) Patent No.: US 8,342,752 B2
(45) Date of Patent: Jan. 1, 2013

(54) ISOLATION BEARING RESTRAINT DEVICES

(75) Inventors: Gil A. Moreno, San Clemente, CA (US); Don A. Hubbard, Valencia, CA (US)

(73) Assignee: Worksafe Technologies, Valencia, CA (US)

( * ) Notice: Subject to any disclaimer, the term of this patent is extended or adjusted under 35 U.S.C. 154(b) by 489 days.

(21) Appl. No.: 12/567,548

(22) Filed: Sep. 25, 2009

(65) Prior Publication Data
US 2011/0072739 A1 Mar. 31, 2011

(51) Int. Cl.
- F16C 41/00 (2006.01)
- F16C 19/10 (2006.01)
- E04B 1/98 (2006.01)
- E04H 9/02 (2006.01)

(52) U.S. Cl. .......................... 384/36; 384/610; 52/167.5

(58) Field of Classification Search .................... 384/36, 384/49, 51, 610, 614; 52/167.1–167.9, 741.3; 14/73.5
See application file for complete search history.

(56) References Cited

U.S. PATENT DOCUMENTS

| | | | |
|---|---|---|---|
| 5,599,106 A | 2/1997 | Kemeny | |
| 6,955,467 B2 * | 10/2005 | Chang et al. | ..................... 384/36 |
| 7,290,375 B2 | 11/2007 | Kemeny | |
| 2006/0054767 A1 | 3/2006 | Kemeny | |
| 2006/0260221 A1 * | 11/2006 | Kemeny | ........................ 52/167.5 |
| 2006/0272226 A1 * | 12/2006 | Robinson et al. | ............. 52/167.4 |

FOREIGN PATENT DOCUMENTS
WO WO 2004/007871 1/2004

* cited by examiner

*Primary Examiner* — James Pilkington
(74) *Attorney, Agent, or Firm* — Stout, Uxa, Buyan & Mullins; Carlos A. Fisher

(57) ABSTRACT

Bearing retention devices and methods for their use in isolation bearings such as seismic bearings. In preferred embodiments, the invention includes a sleeve structure assembly secured by a plurality of elastic straps to upper and lower plates or pans of a rolling ball isolation bearing. The sleeve component is structured to retain the rolling ball within the circumference or area of the bearing plates of each the upper and lower bearing portions of the bearing while permitting the ball to freely roll in any direction during a seismic event.

17 Claims, 5 Drawing Sheets

ISOLATION BEARING RESTRAINT DEVICES

FIELD OF THE INVENTION

The present invention relates, generally, to bearing restraint devices for use in, for example, seismic isolation bearings for supporting various structures and apparatus, and, to bearing restraint devices in isolation platforms that isolate the structures and other loads, from ambient vibrations external to the platform.

SUMMARY OF THE INVENTION

Isolation bearings are used with, for example, bridges, buildings, computers, machines, delicate and/or dangerous equipment, and the like (hereinafter "structures") to protect these structures from damage due to seismic phenomena. The isolation bearings (and platforms and floors containing such isolation bearings) are typically configured to support a specific load, i.e., the weight of the structure being supported. In this regard, it is desirable that a particular seismic isolation bearing be restrained in order to prevent failure of the bearing or instability of the structure being supported.

The conservative character of a seismic isolation bearing may be described in terms of the bearing's ability to absorb displacement energy caused by seismic activity or other external applied forces, and thus to cushion the structure being supported from such displacement. In this regard, features such as a rubber bearing body, leaf spring, coil spring, or the like may be employed to urge the bearing back to its original, nominal position following a lateral displacement caused by an externally applied force such as a seismic tremor. In this context, the bearing "conserves" lateral displacement energy by storing a substantial portion of the applied energy in its spring, rubber volume, or the like, and releases this stored energy upon cessation of the externally applied force to pull or otherwise urge the bearing back to its nominal original position.

Certain isolation bearings may have a laminated rubber bearing body, reinforced with steel plates. More particularly, thin steel plates are interposed between relatively thick rubber plates, to produce an alternating steel/rubber laminated bearing body. The use of a thin steel plate between each rubber plate in the stack helps prevent the rubber from bulging outwardly at its perimeter in response to applied vertical bearing stresses. This arrangement permits the bearing body to support vertical forces much greater than would otherwise be supportable by an equal volume of rubber without the use of steel plates.

Other isolation bearings may comprise steel coil springs combined with snubbers (i.e., shock absorbers). These bearings are often used to vertically support the weight of the structure; such bearings may be most suitable for the support of apparatus and machines. Coil springs, described in International Patent Publication WO 2004/007871, are generally preferable to steel/rubber laminates in applications where the structure to be supported may undergo an upward vertical force, which might otherwise tend to separate the steel/rubber laminate. Rubber bearings are typically constructed of high damping rubber, or are otherwise supplemented with lead or steel yielders useful in dissipating applied energy.

Metallic yielders, however, are disadvantageous in that they inhibit or even prevent effective vertical isolation, particularly in assemblies wherein the metallic yielder is connected to both an upper bearing plate and an oppositely disposed lower bearing plate within which the rubber bearing body is sandwiched.

Steel spring mounts of the type typically used in conjunction with apparatus and machines are generally unable to provide adequate energy dissipation, with the effect that such steel spring mounts generally result in wide bearing movements. Such wide bearing movements may be compensated for through the use of snubbers or shock absorbers to aid in absorbing the energy of the lateral displacement. However, in use, the snubber may impart to the bearing an acceleration on the order of, or even greater than, the acceleration applied to the machine due to seismic activity.

Another example of an isolation bearing is one using a rolling, approximately spherical rigid ball placed between rigid plates. It will be understood that such a rigid ball may itself be referred to as a bearing (such as a ball bearing), or the combination of the rigid ball and the supporting rigid plates may together be referred to as a bearing. In this description generally the word "bearing" shall be reserved for the entire assembly; however, in certain occasions the context may make clear that the ball itself is referred to as a bearing, such as through the use of terms such as "ball bearing", "rolling bearing" or "spherical bearing".

For example, one isolation bearing comprises a lower plate having a wholly or partly conical-shaped cavity and an upper plate having a substantially identical cavity with a rigid ball-shaped bearing placed therebetween. See e.g., Kemeny, U.S. Pat. No. 5,599,106. In another example, an isolation bearing comprises a lower plate having a wholly or partially spherical shaped cavity and an upper plate having a substantially identical cavity with a rigid ball-shaped bearing placed therebetween. In yet another example, such a device includes a bearing comprising a lower plate having a wholly or partially parabolic shaped cavity and an upper plate having a substantially identical cavity with a rigid ball-shaped bearing placed therebetween. Isolation platforms containing such bearings are disclosed in e.g., International Patent Publication No. WO/2004/007871 and US 2006/0054767; Isolation platforms comprising floors are disclosed in e.g., U.S. Pat. No. 7,290,375. Each of these publications and patents, and every other patent, patent application, and publication cited herein, is expressly and individually incorporated by reference herein in its entirety as part of this specification.

Isolation bearings of this type may in general include a bearing comprising a lower plate having, without limitation, a wholly or partially conical, spherical or parabolic shaped cavity, a cavity having a constant slope, or a cavity that is a combination of two or more of these shapes and, an upper plate having a cavity similar to that in the bearing plate, with a rigid ball shaped bearing placed therebetween. The lower plate rests or is fixed or placed on the ground, foundation, platform, support, or base surface, while the structure to be supported rests on the top surface of the upper plate, or the platform or surface which is held up by the isolator bearing or bearings. In this way, when external vibrations, such as seismic movements, occur the lower plate moves relative to the upper plate via the rolling of the spherical ball between the upper and lower plates. The structure supported is thus isolated from the external vibrations.

However, such devices are not without their own drawbacks. For example, depending on the size of the upper and lower plates, such bearings may have a limited range of mobility. That is, the amount of lateral displacement of the upper and lower plates relative to each other may be limited based on the size of the bearing.

Additionally, an isoation bearing may be unstable when used by itself. For example, when a large structure is placed on a relatively small isolation bearing, it may become more likely that the structure could tip and/or fall over. Obviously, with very large, heavy structures, or very delicate or dangerous structures, such failure could be catastrophic.

Similar to instability, the amount of load that any particular bearing can withstand can be limited by its size. Likewise, if the weight of the structure being supported is unevenly distributed, one section of either of the upper or lower plates may tend to bend or deflect more than another and the entire bearing structure could come apart.

Also, in isolation bearings and platforms containing rolling balls a severe shock, such as that caused by a strong seismic tremor, can cause such severe lateral displacement that the ball is ejected from the bearing, causing failure of the bearing.

To overcome such disadvantages there is a need for isolation bearings structures which are more stable (i.e., have less of a tendency to come apart), can withstand a greater load and are more easily integrated into the locations in which they are desired to be installed.

The present invention provides bearing restraints for use in isolation bearings and platforms for supporting various equipment and/or structures ("loads"). These bearings and platforms (including floors) assist in isolating the loads from vibrations ("noise") generated by forces external to the bearing or platform. Generally, in accordance with various embodiments of the present invention, the bearings or platforms comprise upper or isolator plates and lower or bearing plates, having, without limitation, conical depressions, spherical depressions, parabolic depressions or depressions with combinations of these shapes. Preferably, although not necessarily, the upper plate and lower plate are substantially alike, or identical, in their opposing surfaces. In such isolation bearings or platforms the upper plate supports the above-mentioned load(s), and the lower plate contacting the floor, foundation, surface or area directly below the bearing or platform. Between the upper and lower plates, one or more rigid, spherical bearing is placed between the upper and lower plates within the depressions, thereby allowing the upper and lower plates to displace relative to one another. The bearing restraint devices of the present invention restrain the spherical bearings. The spherical bearings are generally made of metal, such as stainless steel, but may be made of any sufficiently rigid material, including a polymer such as a plastic, a hard rubber, and the like. Those of ordinary skill in the art will be aware that a hard, rigid ball, such as a stainless steel ball, making contact with a bearing surface of similar rigidity, will have a minimum of friction.

Alternatively, if a measure of dampening is desired, one or more ball and/or one or more bearing surface may be made to be more pliable (such as with a surface coating of rubber, plastic or the like; or by making all or part of the ball or bearing surface out of such a dampening material).

As lateral forces (e.g., in the form of seismic vibrations) are applied to a bearing, the upper plate is displaced laterally with respect to the lower plate, such that the rigid ball or balls therebetween roll and rotate freely and, if sufficiently hard and rigid, in an almost frictionless manner about their respective depressions or cavities. The ball or balls store the energy of the vibration as potential energy by being raised to higher elevations along the bearing surface, such that, the ball(s) remain in contact with the upper and lower plates and the upper and lower plates thus remain indirectly in contact with each other. Due at least in part to the conical, spherical, parabolic, or other raised shape of the lower and/or upper plates' bearing surfaces, the gravitational forces acting on the structure, and the structure's mass, produce a lateral force component tending to restore the bearing or platform to its original position, with the upper plate(s) being positioned substantially above the lower plate. Thus, in accordance with the present invention, restoring forces are achieved; for example, a conical depression (which yields a substantially triangular cross section) results in a substantially constant restoring force due to the linear hypotenuse of the triangle, while hemispherical or parabolic depressions (or mixtures of different types of depressions), yield restoring forces that vary with the distance of lateral displacement.

In the event that an outside force is strong enough, or long lasting enough, or if the bearing or platform lacks sufficient stability, the upper and lower plate of a bearing may be forcefully moved laterally with sufficient force that the ball or sphere may be thrown from the bearing, causing bearing failure. Such an eventuality could obviously be catastrophic for the structure, equipment, or other load borne by the bearing or plurality of bearings comprising the isolation platform or floor.

The stability of the bearing, floor or isolation platform is increased through the size of its "footprint" (its width versus its height) as compared to the weight distribution of the load. For example, when considering a platform, distances between the apices of a first pan structure (containing, for example, four bearings of the type discussed above) preferably have a ratio of less than 1.25 in relation to the height, width and/or depth of the payload. Additionally, preferably, no more than half of the total weight of the payload is in the upper half of the payload.

Various straps between the upper and lower plates may be attached, thereby allowing lateral displacement between the plates, but preventing unwanted separation of the plates. In addition to, or instead of these straps, one or more isolation bearing restraint may also be used, thereby freely permitting lateral displacement of the bearing due to the rolling sphere between the plates, but preventing bearing failure due to unwanted separation of the plates and/or separation or ejection of the rolling sphere or spheres themselves from between the upper and lower plates.

In certain embodiments, the bearing restraint of the present invention may comprise one or more, preferably two or more, or three or more, or four or more straps retaining one or more sphere substantially within the bearing surface of an upper and/or lower bearing plate or pan so that the sphere is free to roll within said bearing surface when the upper and lower plates or pans are laterally displaced.

Additionally, in accordance with various embodiments of the present invention, the retaining mechanism (such as, for example, retaining straps) may produce additional bearing damping effects, as well as providing retention of the spherical ball component.

Therefore, in a preferred embodiment, the present invention may comprise a bearing retention device that simultaneously prevents the upper and lower bearing surfaces from coming apart, while restraining the spherical bearing within the cavity formed by such surfaces.

In another preferred embodiment, an isolation platform for supporting a payload in accordance with the present invention comprises a first open pan structure having four upper plates with downward facing load-bearing surfaces, wherein the first open pan structure has a plurality of rigid members substantially in the same plane as, and connected to, the plates to form a quadrilateral. The first open pan structure has openings between each upper plate and each bearing surface comprising a recess with a central apex and a conical, spherical or parabolic surface, or combinations of such surfaces, extending from the apex continuously to a location substantially proximal to a perimeter of the recess, wherein distances between the apices of the recesses are preferably at least equal to distances antipodal points of a footprint of the payload. A second open pan structure substantially identical to said first open pan structure (and where the plates are lower plates) is also provided and wherein said first and second open pan structures are positioned such that the bearing surfaces of correspondingly located upper and lower plates of the first and second open pan structures face each other and define four cavities therebetween, each cavity containing at least one rigid ball each.

Said at least one rigid ball located in each cavity is retained by a "cage" or "sleeve" which permits the ball to rotate freely in any direction while restraining the ball within the cavity by means of a plurality of straps that keeps the cage substantially centrally located within its cavity. Preferably, one or more of the straps comprising the plurality of straps is elastic; in a preferred embodiment, each strap of the plurality of straps is elastic. In another preferred embodiment said plurality of straps comprise a polymeric material. In another preferred embodiment, a top portion of the cage is joined to at least four straps, with one or more strap joined at the distal end to a corner of an upper plate located on the first open pan structure. In this embodiment, a bottom portion of the cage is joined to at least four straps, with one or more strap joined at the distal end to a corner of a lower plate located on the second open pan structure.

In the embodiment of the invention just discussed, the first and second open pan structures of the isolation platform are inherently movably fastened together with the (preferably elastic) straps of the described ball restraint device. In this way that the ball restraint device simultaneously limits displacement of the first open pan structure relative to the second open pan structure in a vertical plane and reduces displacement in a substantially horizontal plane of the first (upper) open pan structure relative to the second (lower) open pan structure.

Further still, in accordance with various embodiments of the present invention, the first pan structure (or upper bearing plate may be configured to move in the horizontal plane without moving relative to the second pan structure (or lower bearing plate) in the vertical plane by more than a pre-selected factor relating to the maximum possible or desired horizontal displacement relative to the second pan. Similarly, the first pan structure (or upper bearing plate) may be configured to move in the horizontal plane when the second pan structure (or lower bearing plate) is moving at a rate of up to a pre-selected forces without the first open pan structure moving more than a pre-selected distance in the horizontal plane and relative to the second open pan structure. In each of these cases, such configuration can be rendered by the length of straps comprising the bearing restraint device, the elasticity of the straps comprising the bearing restraint device, or a combination of such methods. Likewise, in another preferred embodiment, one or more spherical ball bearings in an isolation platform for supporting a payload in accordance with the present invention are restrained in a bearing restraint device. The bearing restraint device comprises a cage or sleeve; this cage or sleeve further comprises a first sleeve structure with downward facing, partly spherical or partly concave sleeve inner surface having substantially the same curvature as that of the spherical ball and a substantially identical second sleeve structure with upward facing partly spherical or partly concave inner sleeve surface having substantially the same curvature as that of the spherical balls.

In a preferred embodiment, the downward facing opening of the first sleeve structure has a circumference slightly smaller than the maximum circumference of the spherical ball, and the upward facing opening of the second sleeve structure has a circumference slightly smaller than the maximum circumference of the spherical ball, such that the first and second sleeve structures may be joined with upward and downward facing openings opposing, and with the spherical ball held therewithin.

In this embodiment, the first open sleeve structure has a substantially circular opening on the opposing side of the sleeve from that of the downward facing opening, in which the substantially circular opening is slightly larger than the circumference of a section of the circle ball at the same height from the equator of the ball as the sleeve is thick. Similarly, the second open sleeve structure has a substantially circular opening on the opposing side of the sleeve from that of the upward facing opening, in which the substantially circular opening is slightly larger than the circumference of a section of the spherical ball at the same height from the equator of the ball as the sleeve is thick.

In use, the first and second sleeve structures are positioned in a manner such that the partly spherical or partly concave sleeve inner surfaces of the first and second sleeve structures encase the rigid ball therebetween and wherein the ball, while being retained in the sleeve, is free to rotate within the sleeve and roll on the lower and/or upper plates of the bearing or isolation platform.

In an embodiment of the invention, the partly spherical or partly concave inner surface of the first and second open sleeve surfaces may be further described as defining a partly spherical bore therethrough with a circular opening having a maximum diameter located on the side of the sleeve having the upward or downward facing opening that is slightly larger than the circumference of the spherical ball encased, and a circular opening having a minimum diameter located on the side of the sleeve opposing the upward or downward facing opening that is between about 0.5% to 20% smaller than the equatorial circumference of the rigid ball, such that the rigid ball encased within the sleeve surfaces is free to rotate in any direction within the sleeve surfaces and roll on the lower and/or upper plates of the bearing or isolation platform.

The sleeve structure may alternatively be described as defining a cross-section of a hollow sphere that encases the rigid ball bearing. Preferably, the first and second sleeve structures are fastened to each other via nut and bolt type fasteners, or one or more barb-type male projections on the first sleeve structure which fit into a female receptacle on the second sleeve structure, though alternative means of affixing the first and second sleeve structures together may include gluing, riveting, welding, brazing or the like. The bearing restraint further comprises elastic straps connecting the sleeve structure, for example, at points proximal to or where the first and second sleeve structures are fastened to each other, to points in the rim proximal to or at the perimeter of each the upper plate and lower plate of the bearing or isolation platform, or, when describing an isolation platform, proximal to or at points in the upper and lower frameworks of the platform that the upper and lower bearing plates are fastened to.

The elastic straps are fastened to the assembled sleeve structure and the plates of the bearing or isolation platform and/or the upper and lower platform frameworks preferably via nut-bolt type fasteners, though the straps may be tied, looped, riveted or otherwise fastened by any other effective alternative means of fastening.

In the absence of any external vibration, the elastic straps are preferably kept slightly loose. In the event of a vibration, however, the straps stretch as required and aid in movably maintaining the first and second plate or pan structures in association with each other. Additionally, the bearing retaining device of the present invention simultaneously limits lateral and vertical displacement of the first plate or pan structure relative to the second plate or pan structure.

In an embodiment, the bearing restraint device of the present invention retains the rigid ball or sphere within the assembled sleeve, which is tethered by a plurality of elastic straps to the upper and lower plates or pans. The rigid ball is free to rotate in any direction while being restricted, in a strong vibration, within the circumference or area of the bearing plates of each the upper and lower bearing portions. In this way, the bearing restraint device of the present invention helps maintain bearing integrity during a seismic event.

In one embodiment of the present invention, the elastic straps of the restraint device do not produce damping effects. In another embodiment of the present invention, the ball bearing restraint device prohibits the ball bearing from re-centering when there is any vertical movement of the upper platform as it impacts the rim at the perimeter of the plates.

In yet another embodiment of this invention, the bearing and isolator plates are rectangular or square in shape.

In other embodiments of the present invention, exemplified in the Figures hereof, the depressions and/or cavities in the lower bearing and isolator plates may have varied surfaces defining cavities, recesses, grooves, or combinations of grooves, of various shapes.

BRIEF DESCRIPTION OF THE DRAWINGS

Additional aspects of the present invention will become evident upon reviewing the non-limiting embodiments described in the specification and the claims taken in conjunction with the accompanying figures, wherein:

DETAILED DESCRIPTION OF EXEMPLARY EMBODIMENTS

Figure 1A:
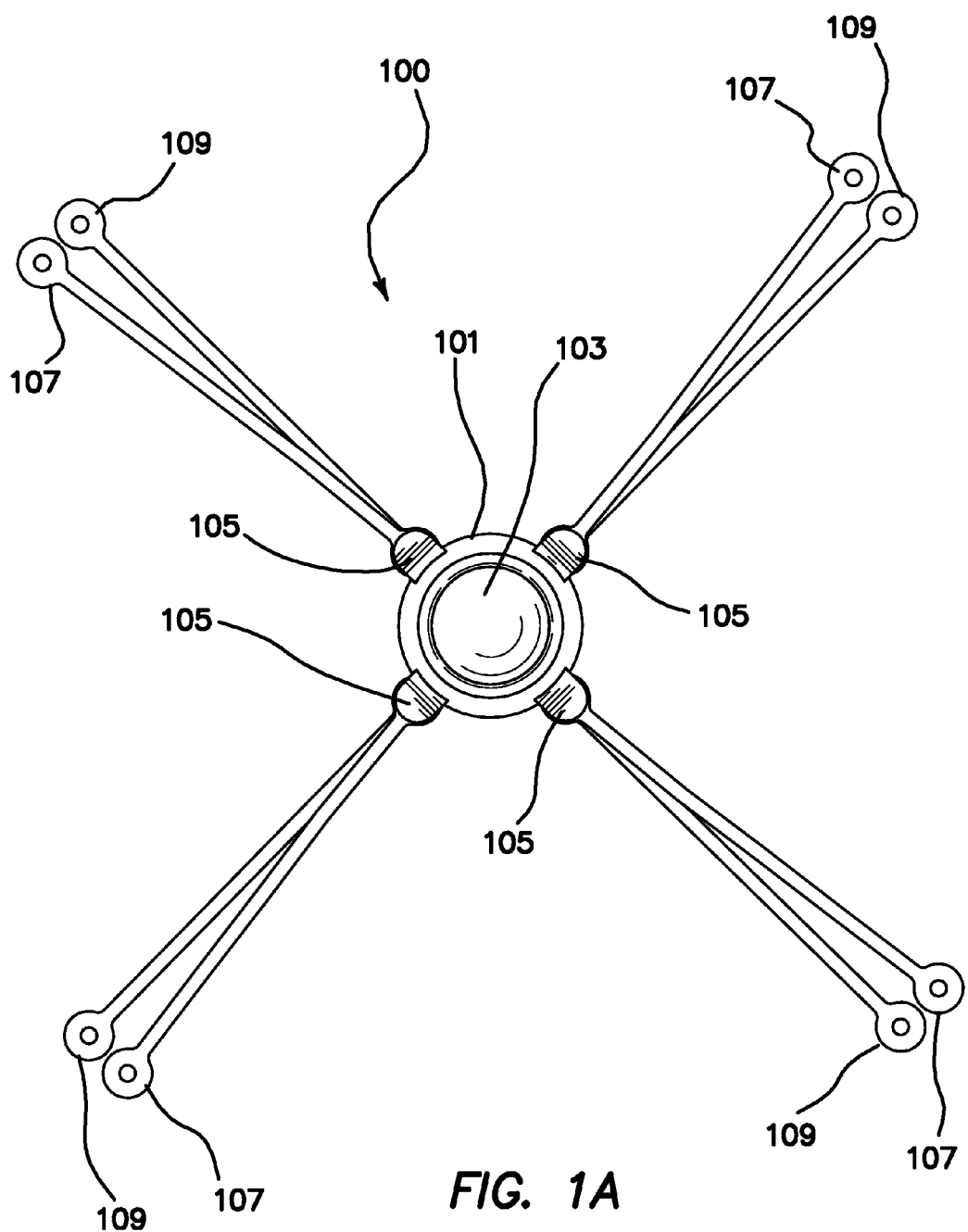
FIG. 1A is a top view of an embodiment of the bearing restraint device of the present invention.

In accordance with various exemplary embodiments of the present invention, FIG. 1 shows a top view of an embodiment of the isolation bearing retainer of the present invention, in disassembled form. The isolation bearing retainer 100 is provided to filter vibrations and prevent a load placed upon the top plate or platform of an isolation bearing or isolation platform to be cushioned from movement due to such vibrations. Preliminarily, it will be appreciated by one skilled in the art that the following description is of exemplary embodiments only and is not intended to limit the scope, applicability, or various possible configurations of the invention in any way. Rather, the following description merely provides convenient illustrations for implementing various embodiments or alternative configurations of the invention. For example, various changes may be made in the design and arrangement of the elements described in the exemplary embodiments herein without departing from the scope of the invention as set forth in the appended claims.

That being said, the isolation bearing retainer of FIG. 1 comprises a spherical bearing 103 surrounded by and retained by a top sleeve portion 101 and a bottom sleeve portion (not shown in this view). The top and bottom sleeve portions, when assembled, form a united sleeve structure surrounding and retaining a volume including the equatorial region of the spherical bearing, while permitting these spherical bearing 103 to rotate in any direction. The top sleeve portion 101 has four "ears" 105 formed into its circumference at angles of approximately 90° from each other. At each ear a top portion elastic strap 107 is affixed; the bottom sleeve portion (not shown in this figure) also comprises four ears interacting with the ears of the top portion and positioned approximately 90° from each other around its circumference; to each of these ears a bottom portion elastic strap 107 is affixed. Other than the location at which the elastic strap is fixed to a portion of the sleeve structure, top portion and elastic strap and the bottom portion elastic strap are identical.

Figure 1B:
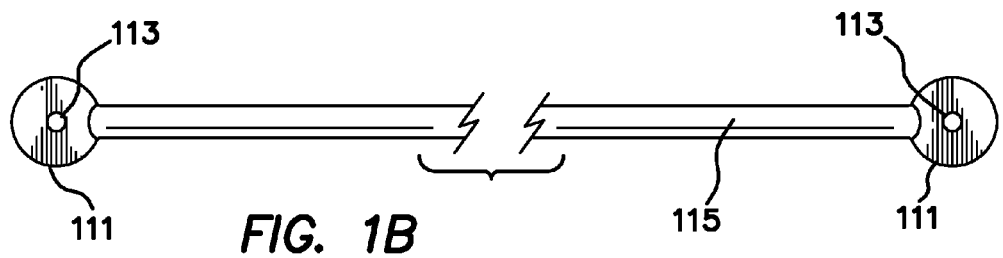
FIG. 1B is a top view of an elastic strap comprised in the embodiment of the bearing restrain device shown in FIG. 1A.

FIG. 1B shows a close-up top view of an embodiment of the elastic strap (107,109) used in the present invention. The elastic strap may be thickened or rounded in one dimension, flat portion 111 located at each end. The thickened or rounded portion 111 has a hole 113 through which a bolt or projection can be used to affix the elastic strap at opposing ends. Those of ordinary skill in the art will appreciate that the thickened portion 111 in this embodiment of the elastic strap need not be rounded but may be any suitable flattened shape.

Figure 1C:
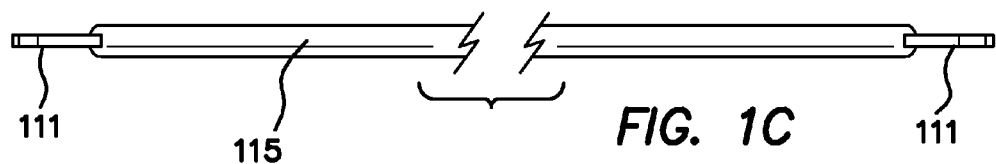
FIG. 1C is a side view of the elastic strap shown in FIG. 1B.

FIG. 1C shows a close-up, side view of the elastic strap shown in FIG. 1B. In this view it is clear that the second or rounded, flat portion 111, visible in FIG. 1B, is flat when viewed from the side. In this embodiment of the invention, the strap itself is approximately round in cross section, and does not vary from top to side views.

Figure 2:
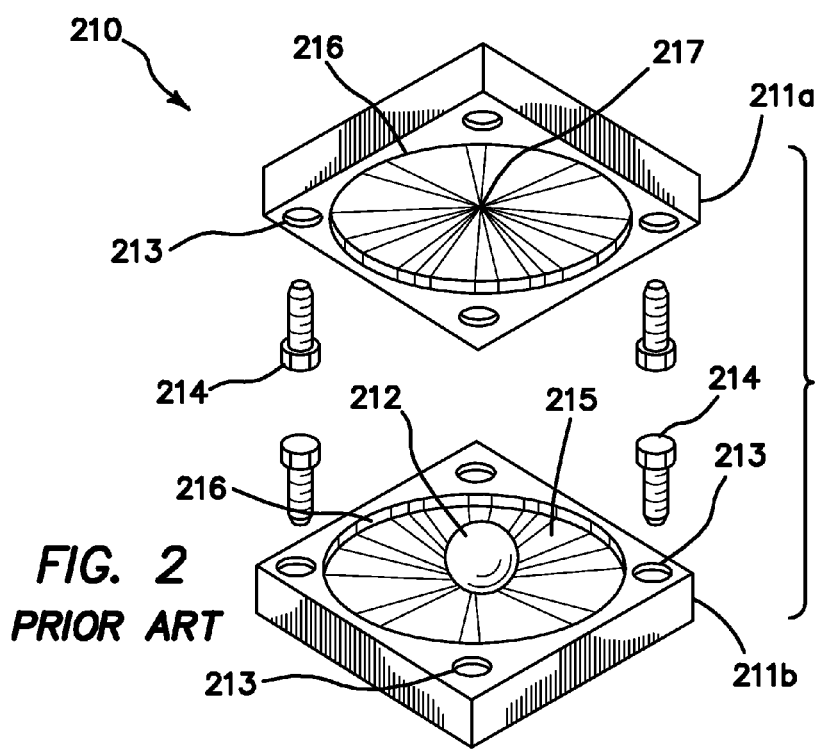
FIG. 2 is a view of a ball in cone isolation bearing in which the bearing restraint device of the present invention may be used.

FIG. 2 shows an embodiment of a ball and cone isolation bearing 210 within which the isolation-bearing retainer 100 of the present invention may be used. The main components of the isolation bearing are upper load plate 211A, lower load plate 211B, spherical bearing 212, conical upper 217 and lower 215 bearing surfaces, a circumference located around and circumscribing upper and lower bearing surfaces 216, holes for anchor bolting 213, and anchor bolts 214. Those of ordinary skill in the art will appreciate that the bearing surfaces need not be conical (or entirely conical), and may have wholly or partly hemispherical or parabolic curved bearing surfaces, or combinations of various shapes as bearing surfaces.

Figure 3:
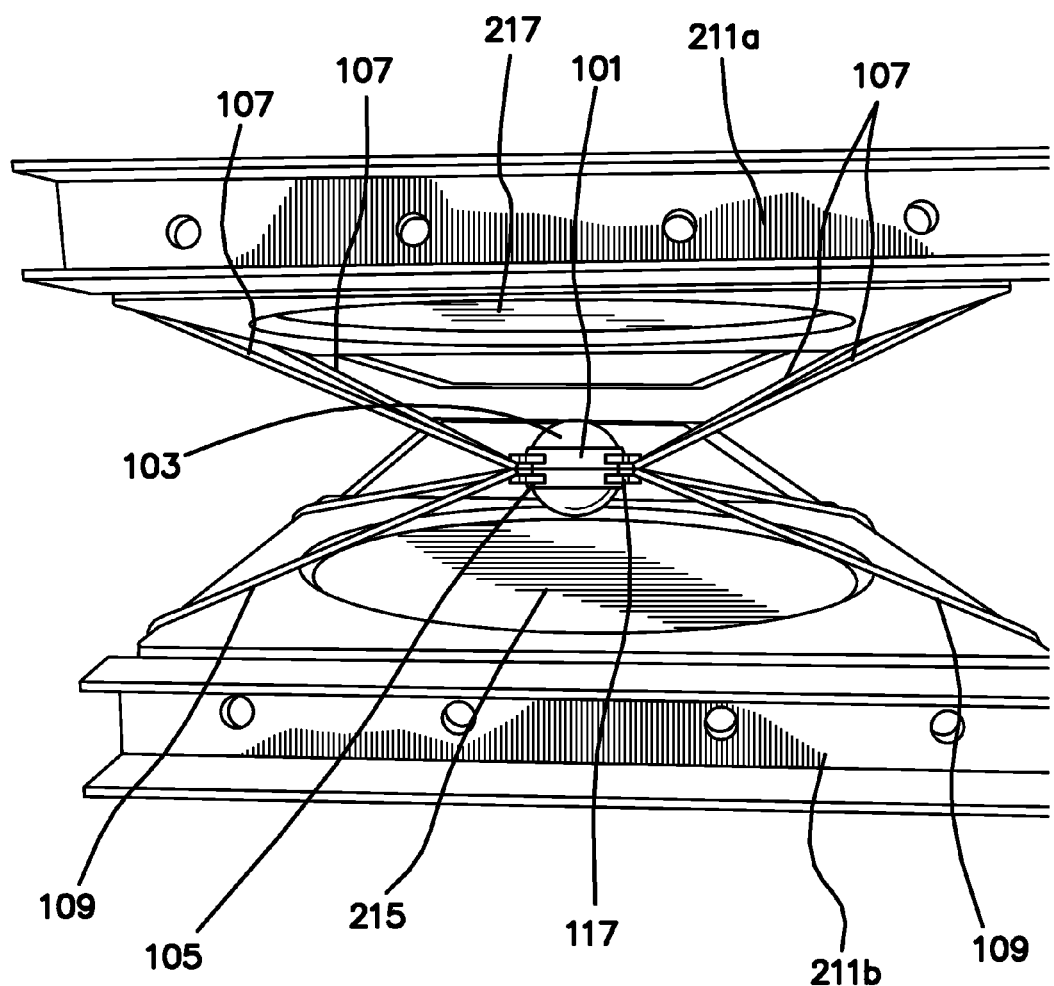
FIG. 3 is a partially exploded view of an isolation bearing in which an embodiment of the bearing restraint device of the present invention has been installed.

FIG. 3 shows a ball in cone isolation bearing similar to that depicted in FIG. 2 with the isolation bearing retaining system in place. In this figure, the bearing is shown in "exploded" configuration, whereby the top and bottom load plates 211a, 211b, respectively, are separated to show the spherical bearing 212 encased in the top sleeve portion 101 and bottom sleeves portion 117. The spherical bearing 212 is positioned between upper load plate 211a, having conical upper bearing surface 217, and lower load plate 211b, having conical lower bearing surface 215. Proximal segments of top portion elastic straps 107 are shown affixed to top sleeve portion 101, while proximal segments of bottom portion elastic straps 109 are affixed to bottom sleeve portion 117. The distal ends of the top portion elastic straps are affixed to the top load plate, and the distal ends of the bottom portion elastic straps are affixed to the bottom load plate. Those of ordinary skill in the art will appreciate that the holes in the distal end of the elastic straps may be aligned with the holes for anchor bolting 213, and anchor bolts 214 in the upper and lower load plates.

Figure 4:
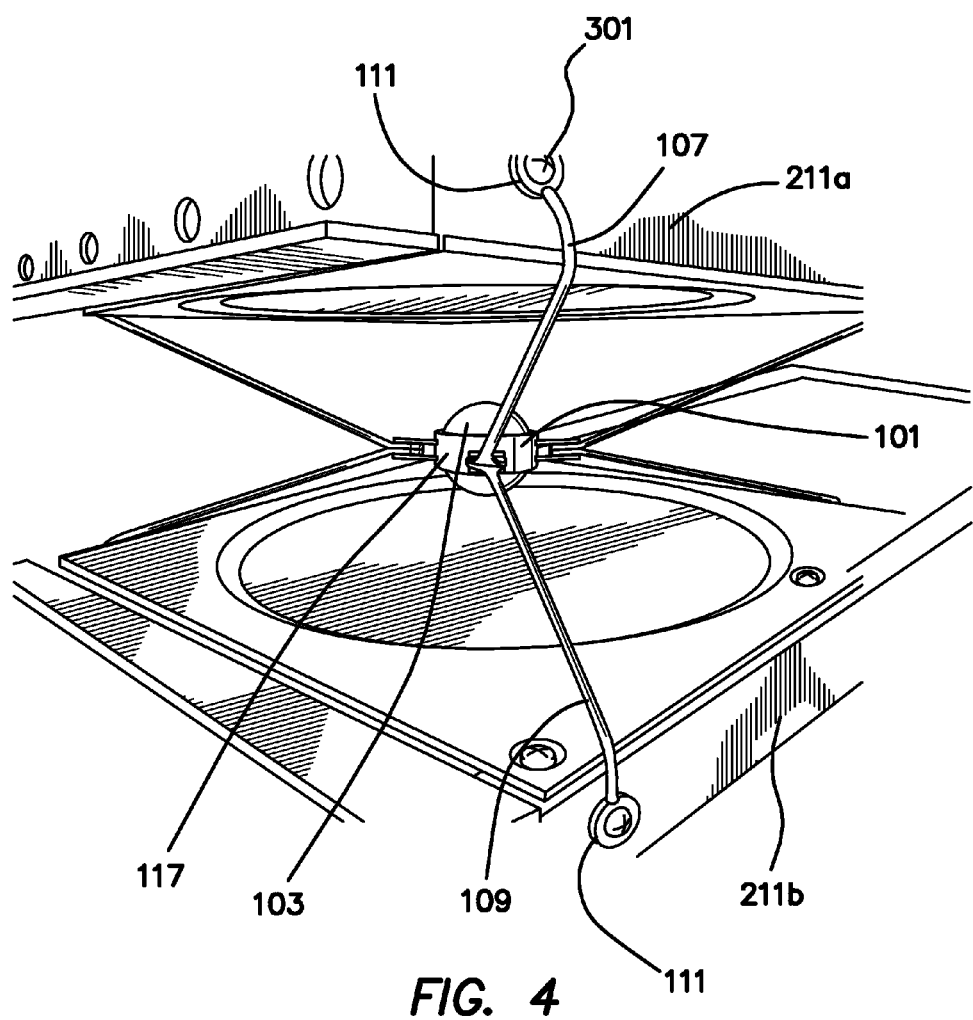
FIG. 4 is an alternative exploded perspective of the isolation bearing of FIG. 3, with bearing retention device installed.

In FIG. 4, the bearing is again shown in "exploded" configuration in a different view, whereby the top and bottom load plates 211*a*, 211*b*, respectively, are separated to show the spherical bearing 212 encased in the top sleeve portion 101 and bottom sleeves portion 117. In this case a top portion elastic strap 107 is shown with a distal end 111 in the foreground and fastened with a screw 301 to an outside surface of top load plate 211*a*. Similarly a bottom portion elastic strap 109 is shown with a distal end 111 in the foreground and fastened with a screw 301 to an outside surface of bottom load plate 211*b*. It will be understood that the elastic straps may be affixed to any other convenient location on the upper and lower plates or platforms of the seismic bearing; and that such location is not limited to the outside surface of a plate or platform.

Figure 5A:
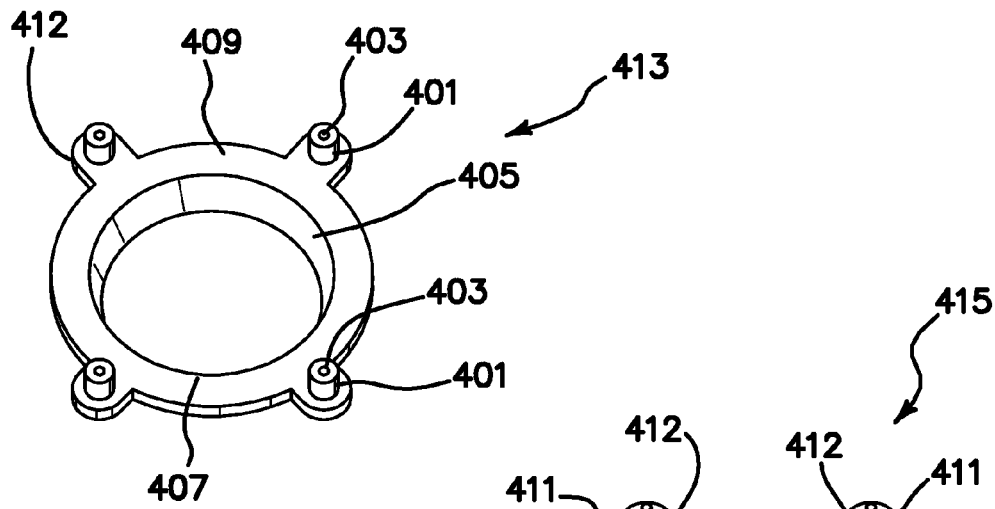
FIG. 5A is a view of a "female" portion of one embodiment of a sleeve system for retaining a spherical ball.

FIG. 5A shows an embodiment of one of the portions of the sleeve structure assembly. This portion (which may be used as either a top portion or a bottom portion) comprises a polymeric or metallic (preferably polymeric) female annulus 413 with 4 ears 412, with each ear 412 located approximately 90° from each other ear around the outer circumference 409 of the annulus. Each ear comprises a raised spacer portion 401 having a hole 403 through the center of it. The inside of the annulus comprises a band 405 having an inner circumference slightly less than the maximum (equatorial) circumference of the spherical bearing. In preferred embodiments the band 405 is curved or tilted to conform, either approximately or closely, with the curvature of the spherical bearing.

Figure 5B:
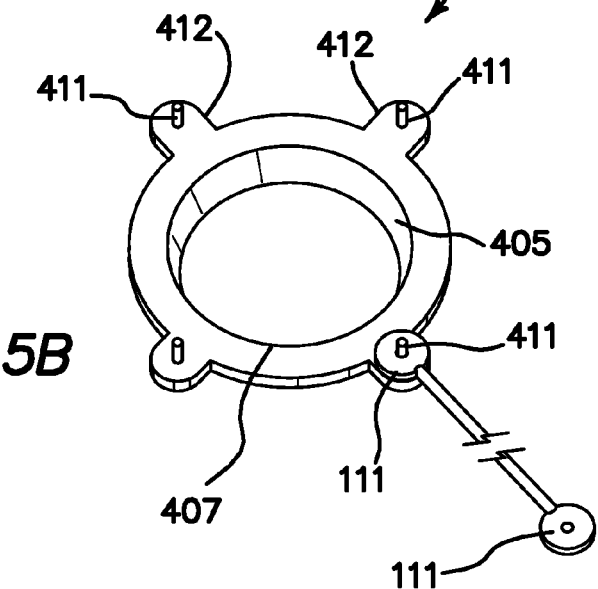
FIG. 5B is a top view of a "male" portion of one embodiment of a sleeve system for retaining a spherical ball.

FIG. 5B shows an embodiment of another one of the portions of the sleeve structure assembly designed to match and mate with the portion depicted in FIG. 5A. This portion (which also may be used as either a top portion or a bottom portion) comprises a polymeric or metallic (preferably polymeric) male annulus 415 with four ears 412 containing posts 411 and each ear located approximately 90° from each other ear around the circumference of the annulus. Each post 411 is approximately cylindrical in shape and has a circumference slightly less than the circumference of the holes 403 found in corresponding positions on sleeve portion 413 shown in FIG. 5A, thus permitting the two sleeve portions to be fitted and joined together. As in the portion shown in FIG. 5A, the inside of the annulus comprises a band 405 having an inside circumference slightly less than the circumference of the spherical bearing. In certain embodiments the band 405 may be curved or tilted to conform, either approximately or closely, with the shape of a sub- and/or super-equatorial region of the spherical bearing.

Figure 6:
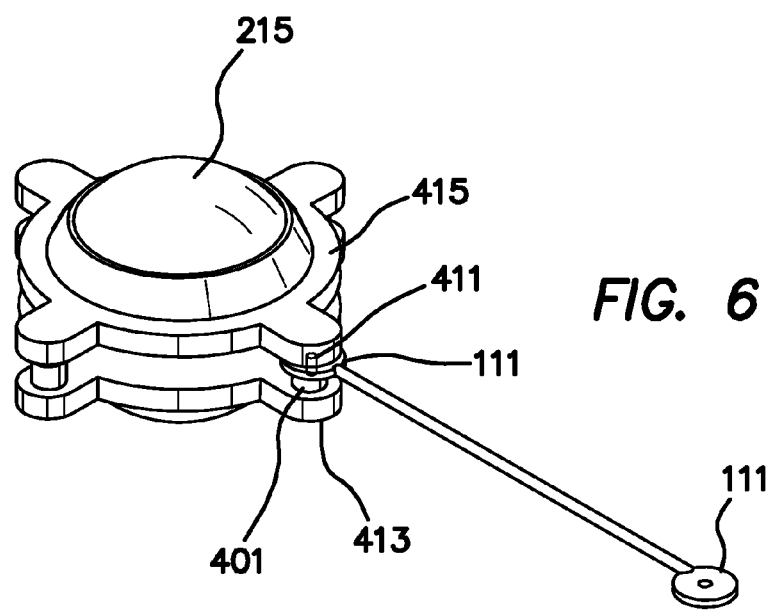
FIG. 6 is an exploded view showing a spherical bearing contained within the male and female sleeve portions shown in FIG. 5A and FIG. 5B, and the method of attachment of one elastic strap.

As shown in FIG. 6 when the two portions depicted in FIGS. 5A and 5B are fitted together with the spherical bearing located between them, posts 411 on male sleeve portion 415 are fitted through the hole 113 at an end 111 of one or more elastic strap 107,109 before being inserted into the hole 403 in the "female" sleeve portion 413. In this way the elastic straps can be affixed to the bearing retention sleeve.

It will be understood that, in accordance with various embodiments, rather than the conical load bearing surfaces shown in the foregoing examples, each of the plates may comprise corresponding concave, generally conical surfaces or spherical or parabolic surfaces (recessed surfaces) which create a plurality of conical or spherical or parabolic cavities therebetween. An example of such surfaces can be seen in the figures and disclosure of, e.g., Kemeny, U.S. Patent Publication 2006/0054767, previously incorporated by reference herein as part of the disclosure of this patent application. Generally speaking, it should be appreciated that any suitable combination of radial or linear surfaces may be employed in the context of recesses in accordance with the present invention. In addition, the surfaces may have, for example, a constant continuous slope or a varying continuous slope.

In the case of a platform comprising more than one isolation bearing, or a complex isolation bearing comprising more than one spherical bearing (such as more than one ball bearing), the upper isolation platform has a plurality of downward-facing, conical or spherical or parabolic, rigid bearing surfaces or surfaces with combinations of such shapes. For example, the lower plate or platform may be secured to a foundation or other support surface (e.g., mechanically (such as by bolting or screwing) or by gravity and the weight of platform itself) for supporting the structure to be supported, and has a plurality of upward-facing, conical or spherical or parabolic, rigid bearing surfaces or surfaces with or combinations of such shapes disposed opposite downward-facing, conical, rigid bearing surfaces. Thus, the downward and upward bearing surfaces define a plurality of bearing cavities between said upper and lower plates, within which a plurality of rigid spherical balls are interposed between said downward and upward bearing surfaces.

With further particularity in the presently described exemplary embodiment, the downward and upward bearing surfaces may comprise central apices having the same curvature as that of the rigid spherical balls to prevent movement of the apparatus in the event of slight external forces. However, it may be desirable that the apices are shallow, or (in alternate embodiments even absent) so as to prevent resonance and harmonic disturbances when the apparatus is active after a significant vibration. Additionally, the surfaces may have recess perimeters surrounding the bearing surfaces such that the bearing surface connects the central apices and recess perimeters with either continuous (linear or curved) or varying slope. Thus, the curvature of the spherical balls and the downward and upward bearing surfaces are configured such that as the spherical balls and upper and lower plates displace laterally relative to one another, vertical displacement of upper and lower plates is generally less than lateral displacement.

Although the foregoing invention has been described in detail for purposes of clarity of understanding, it will be obvious that certain modifications may be practised within the scope of the appended claims. All publications and patent documents cited herein are hereby incorporated by reference in their entirety for all purposes to the same extent as if each were so individually denoted.

We claim:

1. A restraining device for a spherical bearing of an isolation bearing, the restraining device comprising:
   a sleeve structure assembly structured to partially encase the spherical bearing, comprising
     i) a first sleeve portion comprising an annulus having an outer circumference and an inner circumference, and a band extending longitudinally from the inner circumference of the annulus; said band having a maximum circumference less than an equatorial circumference of the spherical bearing, and
     ii) a second sleeve portion comprising a annulus having an outer circumference and an inner circumference, and a band extending longitudinally from the inner circumference of the annulus; said band having a maximum circumference less than an equatorial circumference of the spherical bearing, wherein the first sleeve portion and the second sleeve portion are structured to lock together, thereby encasing at least an equatorial region of the spherical bearing, and iii) a plurality of elastic straps affixed at proximal ends to said sleeve structure assembly and structured to be affixed at their distal ends to a location on an upper or lower plate or pan of the isolation bearing, wherein the plurality of elastic straps have a length such that, when installed in an isolation bearing at rest, the sleeve structure assembly is suspended substantially in the center of a cavity formed between a downward-facing load bearing surface and an upward-facing load bearing surface, and wherein a first set of said plurality of elastic straps is affixed to the upper plate or pan of an isolation bearing, and a second set of said plurality of elastic straps is affixed to the lower plate or pan.

2. The composition of claim 1 wherein the first sleeve portion comprises a plurality of ears, with each ear comprising a hole for fastening to said second sleeve portion.

3. The composition of claim 2 wherein the first sleeve portion comprises a plurality of raised spacer portions in which said holes are located.

4. The composition of claim 1 wherein the second sleeve portion comprises a plurality of ears, with each ear comprising a post for fastening to said first sleeve portion.

5. The composition of claim 1 wherein the first sleeve portion comprises a plurality of ears, with each ear comprising a hole for fastening to said second sleeve portion and the second sleeve portion comprises a plurality of ears, with each ear comprising a post for fastening to said first sleeve portion.

6. The composition of claim 1 wherein an inner surface of the band is curved to conform to the curvature of the rolling spherical bearing.

7. The composition of claim 1 wherein the first sleeve portion and the second sleeve portion comprise a polymeric material.

8. The composition of claim 1 wherein the elastic straps comprise a polymeric material.

9. The composition of claim 1 wherein an anchor bolt of an isolation bearing is affixed to the distal end of at least one of the plurality of elastic straps.

10. An isolation bearing comprising:
a) an upper plate comprising a recessed downward-facing load bearing surface and an opposing lower plate comprising a recessed upward-facing load bearing surface, wherein the opposing upper load bearing surface and lower load bearing surface together define a cavity, and
b) at least one spherical bearing in the cavity between said load bearing surfaces,
c) said at least one spherical bearing being suspended between said upper plate and said lower plate, restrained and partially encased by a bearing restraint device comprising a sleeve structure assembly having a first sleeve portion and a second sleeve portion and affixed by a plurality of elastic straps to said upper plate and said lower plate,
d) wherein the first sleeve portion and the second sleeve portion are structured to be fastened together, with each sleeve portion comprising an annulus having an outer circumference and an inner circumference, and a band extending longitudinally from the inner circumference of the annulus; said band having a maximum circumference less than an equatorial circumference of the spherical bearing.

11. The isolation bearing of claim 10 in which the upward-facing bearing surface and the downward-facing bearing surface are substantially identical.

12. The isolation bearing of claim 10 in which at least one of said upward-facing bearing surface and the downward-facing bearing surface is at least partially conical in shape.

13. The isolation bearing of claim 10 in which at least one of said upward-facing bearing surface and the downward-facing bearing surface is at least partially spherical in shape.

14. The isolation bearing of claim 10 in which at least one of said upward-facing bearing surface and the downward-facing bearing surface is at least partially parabolic in shape.

15. The isolation bearing of claim 10 in which at least one of said upward-facing bearing surface and the downward-facing bearing surface has a segment that possesses a constant slope.

16. The isolation bearing of claim 10 in which an inner circumferential surface of each band is curved to conform with the curvature of the spherical bearing.

17. A method for restraining a rolling spherical bearing of an isolation bearing within an upper load bearing surface and a lower load bearing surface of said isolation bearing during a seismic vibration comprising:
a) encasing said rolling spherical bearing partially within a sleeve structure assembly comprising a first sleeve portion and a second sleeve portion, wherein the first sleeve portion and the second sleeve portion are structured to be fastened together; the first sleeve portion and the second sleeve portion each comprising an annulus having an outer circumference and an inner circumference, and a band extending longitudinally from the inner circumference of the annulus; said band having a maximum circumference less than an equatorial circumference of the spherical bearing, wherein the rolling spherical bearing is free to roll in any direction,
b) elastically affixing the sleeve structure apparatus to both an upper and lower plate of said isolation bearing in such a way that, when at rest, the rolling spherical bearing is suspended substantially between the upper load bearing surface and the lower load bearing surface and during said seismic vibration the spherical bearing is elastically restrained between the upper load bearing surface and the lower load bearing surface of said isolation bearing.

* * * * *